(12) United States Patent
Kyrstein

(10) Patent No.: US 7,341,421 B2
(45) Date of Patent: Mar. 11, 2008

(54) WORKPIECE TURNING APPARATUS

(75) Inventor: John P. Kyrstein, Prince George (CA)

(73) Assignee: North Central Machine Works Ltd., Prince George (CA)

( * ) Notice: Subject to any disclaimer, the term of this patent is extended or adjusted under 35 U.S.C. 154(b) by 244 days.

(21) Appl. No.: 11/047,700

(22) Filed: Feb. 2, 2005

(65) Prior Publication Data

US 2006/0180432 A1  Aug. 17, 2006

(51) Int. Cl.
B65G 47/24  (2006.01)
(52) U.S. Cl. .................. 414/763; 198/402; 198/403; 198/416
(58) Field of Classification Search ........ 414/758–763, 414/771, 773, 783; 198/402–404, 410, 414, 198/416
See application file for complete search history.

(56) References Cited

U.S. PATENT DOCUMENTS

| | | | | |
|---|---|---|---|---|
| 3,887,066 | A * | 6/1975 | Houtsager | 198/403 |
| 4,020,941 | A * | 5/1977 | Kennedy | 198/402 |
| 4,573,863 | A * | 3/1986 | Picotte | 414/763 |
| 4,798,278 | A | 1/1989 | Cornacchia | |
| 5,358,372 | A * | 10/1994 | Meredith | 414/778 |
| 5,482,140 | A | 1/1996 | Moore | |
| 5,743,374 | A * | 4/1998 | Monsees | 198/403 |
| 5,836,438 | A * | 11/1998 | Jung | 198/402 |
| 6,142,287 | A | 11/2000 | Biffert et al. | |
| 6,272,437 | B1 | 8/2001 | Woods et al. | |
| 6,446,785 | B1 * | 9/2002 | Tremblay | 198/404 |
| 6,769,529 | B2 * | 8/2004 | Fournier et al. | 198/403 |
| 6,782,991 | B2 * | 8/2004 | Johansson | 198/401 |
| 6,793,454 | B2 * | 9/2004 | Brizzi | 414/767 |

FOREIGN PATENT DOCUMENTS

CA   2422285 A1   9/2003

OTHER PUBLICATIONS

Rick Crosby, Sawmilling—Taking control, Logging and Sawmilling Journal, Sep. 9, 2001, pp. 1-4, http://www.forestnet.com/archives/Sept_01/Taking_Control.htm.
Shark-Fin(tm) Board Turners, www.4sawmills.com/boardturners.jsp, Redco Group 2000.

* cited by examiner

*Primary Examiner*—Douglas A Hess
(74) *Attorney, Agent, or Firm*—Oyen Wiggs Green & Mutala LLP

(57) ABSTRACT

This application relates to a self-contained apparatus for mechanically turning individual workpieces travelling on a conveyor, such as lengths of lumber travelling into or exiting from a sawmill. The invention reduces the need for lumber graders to turn lumber manually and thereby helps avoid repetitive motion injuries. The apparatus includes an adjustable height frame which is positionable alongside the conveyor. The frame supports a workpiece holder defining an open-ended slot for temporarily receiving an end portion of a workpiece. When the end of a lumber board or other workpiece is received within the holder, a proximity sensor causes the holder to rotate, thereby turning the workpiece lengthwise 180 degrees. The workpiece is then deposited on to the conveyor in its inverted orientation for further travel thereon. The apparatus may also optionally permit workpieces to pass through the holder when a "skip" rather than an "invert" signal is received. The workpiece holder may be connected to a rotatable shaft driven by an electric or hydraulic motor.

31 Claims, 4 Drawing Sheets

WORKPIECE TURNING APPARATUS

TECHNICAL FIELD

This application relates to a self-contained apparatus for mechanically turning individual workpieces travelling on a conveyor, such as lengths of lumber travelling into or exiting from a sawmill. The invention reduces the need for lumber graders to turn lumber manually and thereby helps avoid repetitive motion injuries.

BACKGROUND

Quality control in sawmills is becoming increasing important. Lumber graders are hired to examine lumber travelling on sawmill conveyors to separate high quality lumber from lower quality grades. In order to grade individual lumber pieces, the graders frequently need to turn the lumber pieces. Over time this may result in repetitive motion injuries such as carpo tunnel syndrome. Also, manually turning lumber boards is time consuming and can distract the operator from the primary task of grading the lumber.

Some mechanical lumber board turners are know in the prior art to address this problem. Shark Fin™ board turners available from Redco Group are capable of turning boards individually. However, such prior art board turners require modification to the conveyor chain itself (i.e. the mounting of pins or other actuators on the chain for engaging the boards). The use of pin actuators takes up space on the conveyor, limits conveyor speed and may require the use of a singulator to place the boards on the conveyor chain in the required orientation. Moreover, such systems are capable of rotating the boards in one direction only.

Devices are known in the patent literature for turning workpieces travelling on a conveyor. U.S. Pat. No. 4,798,278, Cornacchia, dated Jan. 17, 1989 discloses a conveyor for turning packages upside down in a very gentle manner which eliminates the need for any mechanism which grips the package in order to turn it. However, the Cornacchia device is not adapted for engaging an end portion of the workpiece or for optionally allowing the workpiece to travel through the device.

U.S. Pat. No. 5,482,140, Moore, dated Jan. 9, 1996 relates to a rotary board inverter which relies on the motive force of the boards themselves to invert the boards. The inverter is mounted directly on the conveyor and does not include any means for skipping inversion of selected boards.

U.S. Pat. No. 5,836,438, Jung, dated Nov. 17, 1998 and U.S. Pat. No. 6,142,287, Biffert et al., dated Nov. 7, 2000 disclose other means for inverting, diverting or skipping workpieces travelling on a conveyor. The Biffert et al. includes a servo motor connectable to electronic control circuitry for rotating a pivot shaft. The Jung and Biffert et al. devices are relatively complex and are not adapted for engaging an end portion of a travelling workpiece.

The need has therefore arisen for an improved workpiece turning apparatus which overcomes the limitations of the prior art.

SUMMARY OF INVENTION

In accordance with the invention, an apparatus for turning a workpiece traveling on a conveyor is provided. The apparatus moves the workpiece from a first orientation to a second orientation and deposits the workpiece on the conveyor in the second orientation for further travel thereon.

The apparatus includes a workpiece holder for receiving an end portion of the workpiece; a sensor for detecting the relative proximity of the workpiece and the workpiece holder; and a rotation assembly for rotating the workpiece holder when the workpiece is within the holder.

The apparatus includes a housing for supporting the workpiece holder adjacent a side of said conveyor. The housing is height-adjustable for varying the vertical position of the workpiece holder relative to the conveyor. In one embodiment the apparatus is configured to rotate the workpiece lengthwise 180 degrees when turning the workpiece from the first orientation to the second orientation. Preferably the workpiece holder comprises first and second spaced-apart surfaces defining a slot therebetween for receiving the workpiece. The slot is open-ended to permit passage of the workpiece into and out of the slot. The first and second surfaces may be joined together at a location remote from the conveyor such that the workpiece holder is U-shaped in cross-section.

The rotation assembly moves the workpiece holder between a first position wherein one of the first and second surfaces is above the workpiece and the other of the first and second surfaces is below the workpiece, and a second position wherein the one of the first and second surfaces is below the workpiece and the other of the first and second surfaces is above the workpiece. Rotation of the workpiece holder is stopped when the workpiece holder moves from the first position to the second position, thereby permitting the workpiece to exit from the slot in the second position. The sensor senses when the workpiece has passed into the slot and is in the first or second positions.

The rotation assembly may include a rotatable shaft coupled to an end of the workpiece holder remote from the conveyor. The rotation assembly may include an actuator for periodically driving rotation of the shaft. The actuator may comprise, for example, an electric or hydraulic motor. Preferably the sensor is operatively coupled to the actuator for actuating rotation of the workpiece holder when the workpiece holder is in the first position. A controller receiving input from the sensor may also be provided for controlling operation of the actuator.

Preferably the apparatus is adapted for turning lengths of lumber traveling on a conveyor. In one embodiment, the first and second surfaces extend in parallel planes and are spaced apart a sufficient distance to permit an end portion of a length of lumber to pass through the slot.

In one particular embodiment the invention comprises an apparatus for turning a workpiece traveling on a conveyor and includes a housing positionable adjacent one side of the conveyor for supporting a rotatable member; workpiece engagement means coupled to the rotatable member and positionable overlapping a portion of the conveyor for engaging an end portion of the workpiece; a sensor for sensing the presence of the workpiece proximate the workpiece engagement means; and an actuator operatively coupled to the sensor for causing rotation of the rotatable member and hence the workpiece engagement means, whereby the apparatus turns the workpiece lengthwise 180 degrees and releases the workpiece on to the conveyor for further travel thereon.

A method of turning a workpiece traveling on a conveyor is also described comprising:

(a) positioning a workpiece turning apparatus adjacent the conveyor, the apparatus having a workpiece holder for receiving an end portion of the workpiece;

(b) sensing when the workpiece has passed into the holder; and (c) rotating the workpiece holder to thereby cause rotation of the workpiece lengthwise 180 degrees to an inverted orientation.

In accordance with the method the workpiece is then released on to the conveyor in the inverted orientation for further travel thereon.

BRIEF DESCRIPTION OF DRAWINGS

In drawings which illustrate embodiments of the invention but which should not be construed as restricting the spirit or scope of the invention in any way.

DESCRIPTION OF INVENTION

Figure 1:
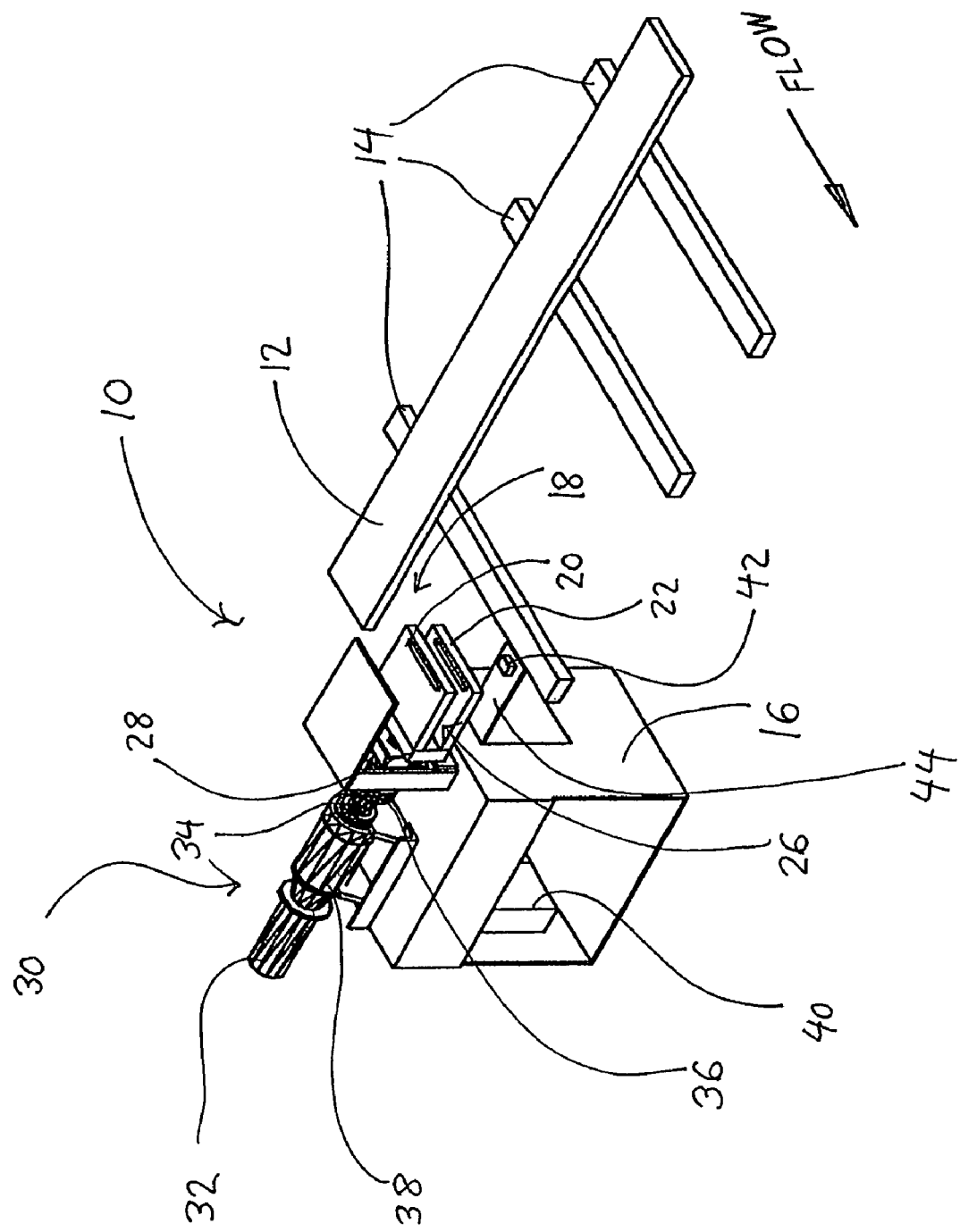
FIG. 1 is an isometric view of the Applicant's workpiece turning apparatus positioned alongside a lumber conveyor.

This application relates to a self-contained workpiece turning apparatus 10 for mechanically turning individual workpieces 12 travelling on a conveyor 14. As shown in FIG. 1, workpieces 12 may consist of lengths of lumber travelling on conveyor 14 in the direction of the arrow for delivering the lumber to or from a sawmill. The invention reduces the need for lumber graders to turn lumber manually and thereby helps avoid repetitive motion injuries. As will be appreciated by a person skilled in the art, apparatus 10 could be similarly used to avoid manual turning of other types of workpieces 12 travelling on a conveyor, such as manufactured articles.

Apparatus 10 includes an adjustable height frame 16 which is positionable alongside conveyor 14. Frame 16 supports a workpiece holder 18 consisting of first and second spaced-apart plates 20 and 22 defining an open-ended slot 26 therebetween. Plates 20, 22 may be connected together by a third plate 28 at a location removed from conveyor 14 such that holder 18 is U-shaped in cross-section.

Frame 16 also supports a workpiece rotation assembly 30 which is coupled to holder 18. As illustrated in the drawings, rotation assembly may include a servo motor 32 for driving rotation of a shaft 34 coupled to holder plate 28 by means of a coupling 36. A gear reducer 38 may be connected between motor 32 and coupling 36 for increasing the torque which may be applied to workpiece holder 18 and to limit the load applied to motor 32. Frame 16 also supports an electronic controller 40 for controlling operation of rotation assembly 30 and hence turning of workpiece 12, as described below.

Apparatus 10 further includes a sensor 42 for sensing when workpiece 12 is in proximity to workpiece holder 18. In the illustrated embodiment, sensor 42 is mounted on a support 44 extending underneath holder 18 below the elevation of conveyor 14. Sensor 42 may comprise a conventional laser beam emitter or the like.

Figure 2:
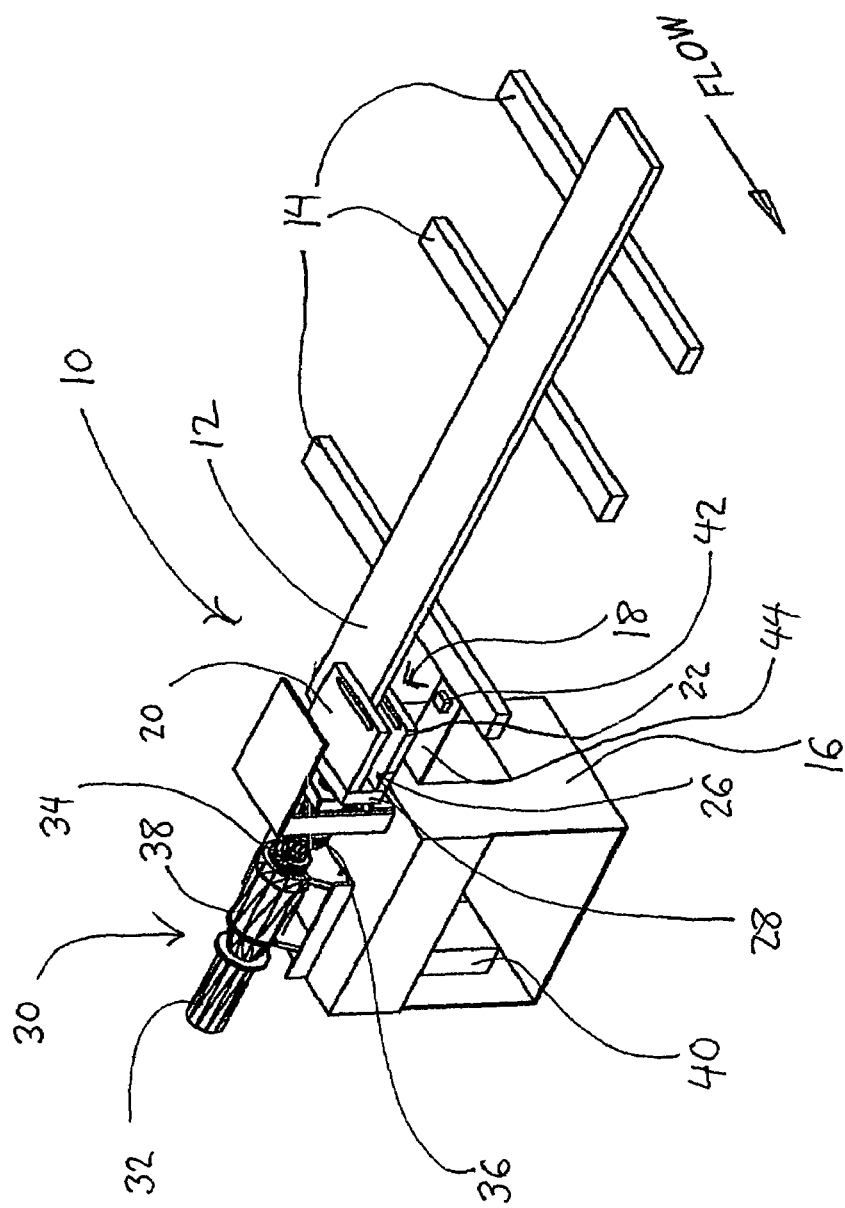
FIG. 2 is an isometric view showing an end portion of a length of lumber entering the workpiece holder slot of the apparatus of FIG. 1.
Figure 3:
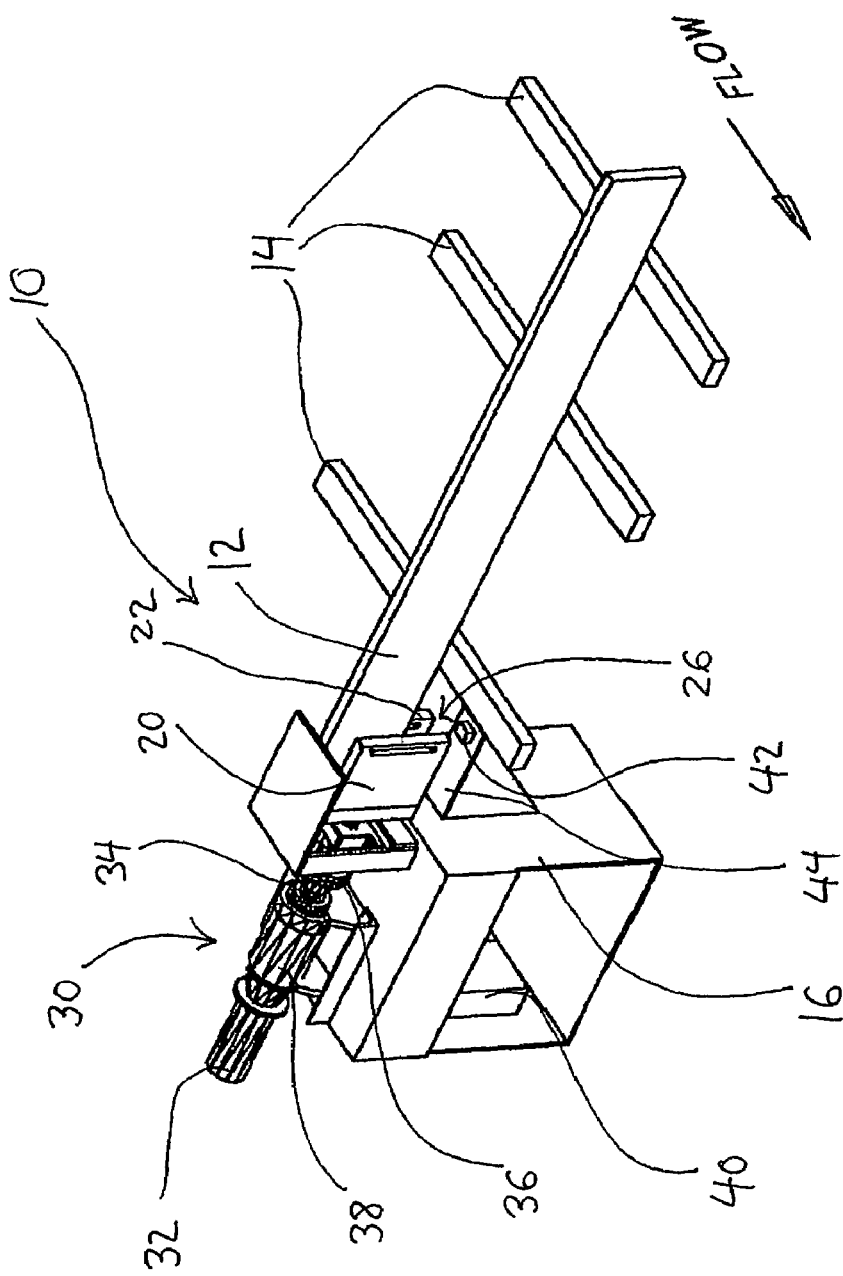
FIG. 3 is an isometric view showing the workpiece holder and length of lumber of FIGS. 1 and 2 rotated 90 degrees.
Figure 4:
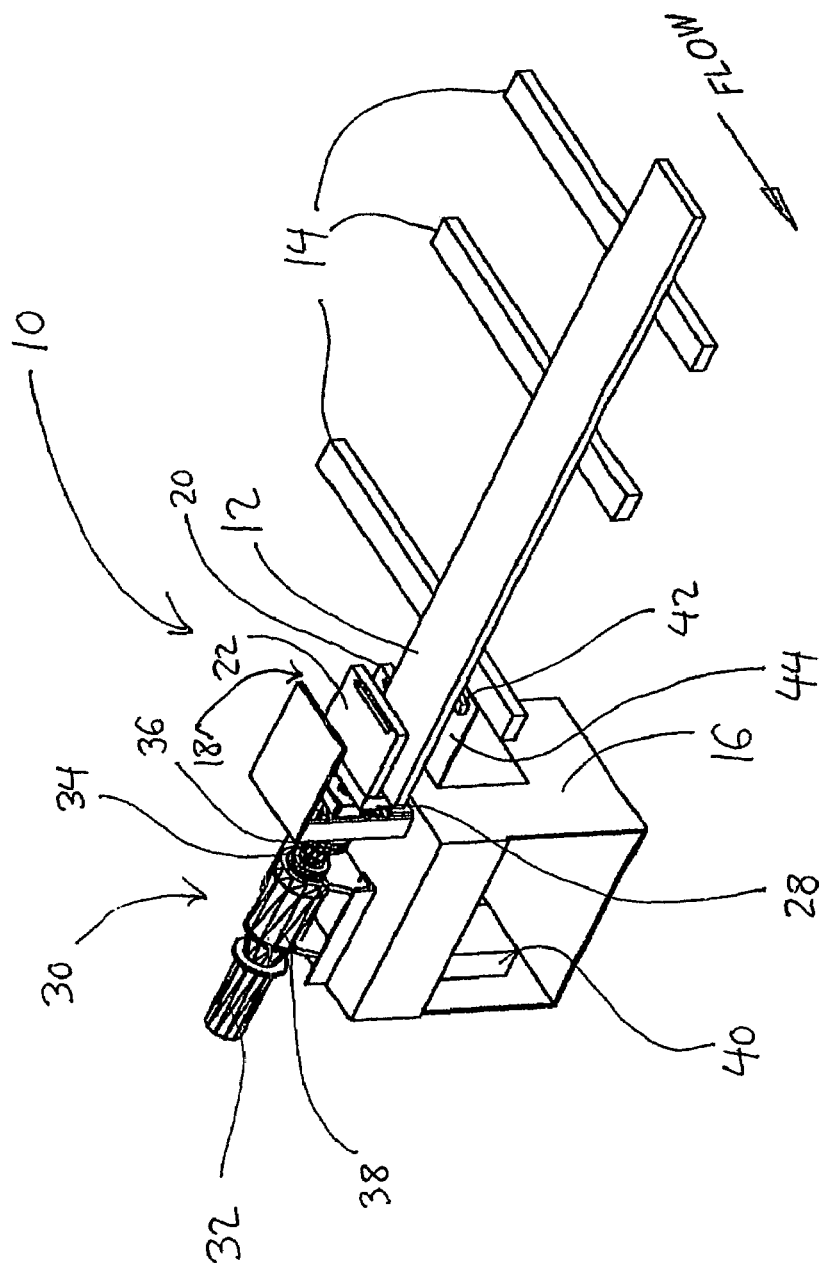
FIG. 4 is an isometric view showing the workpiece holder and length of lumber of FIGS. 1 and 2 rotated 180 degrees and showing the lumber travelling out of the holder slot in an inverted orientation.

In operation, frame 16 is positionable alongside conveyor 14 and is adjustable in height so that slot 26 of holder 18 is at the same elevation as travelling workpieces 12. Slot 26 is of a sufficient size to enable an end portion of each workpiece 12 to pass therethrough. As shown in FIG. 2, the passage of workpiece 12 into slot 26 is detectable by sensor 42. For example, the presence of workpiece 12 within a central portion of slot 26 could trip a laser beam or other light beam causing sensor 42 to send a control signal to controller 40. Controller 40 then triggers motor 32 to actuate rotation of rotatable shaft 34 connected to workpiece holder 18 by coupling 36. This in turn causes rotation of holder 18 and workpiece 12 held within slot 26. FIG. 3 shows workpiece 12 rotated lengthwise 90 degrees and FIG. 4 shows workpiece 12 rotated lengthwise 180 degrees to an inverted orientation relative to the orientation of FIG. 1. As shown in FIG. 4, workpiece 12 is deposited on conveyor 14 in the inverted orientation for further travel in the direction of the arrow away from apparatus 10. As can be in FIGS. 2 and 4, workpiece passes into holder slot 26 through an open end thereof and also passes out of slot 26 through an open end thereof. Holder 18 is then in a position to receive the next-in-sequence workpiece 12.

In one embodiment of the invention, controller 40 may be programmed to process a "skip" rather than an "invert" signal from sensor 44 or some other input, including operator controlled input. In this event, workpiece 12 may pass entirely through slot 26 (i.e into one open end thereof and out the other open end) without triggering holder 18 to invert the orientation of the workpiece 12. For example, controller 40 could be programmed (for example, using a counter) to turn every second or third workpiece 12 rather than every single item. This functionality could be used if multiple graders are positioned at different spaced-apart positions on the same conveyor 14 (each grader using a corresponding workpiece turning apparatus 10). Controller 40 could also be programmed to turn workpiece 12 in either a clockwise or counter-clockwise direction depending upon the application and the positioning of apparatus 10 relative to conveyor 14.

One advantage of workpiece turner 10 is that it is a self-contained unit which can be installed alongside any conveyor 14. Unlike prior art lumber turning systems, no modification to the conveyor itself is required.

As will be appreciated by a person skilled in the art, other means for actuating rotation of workpiece holder 18 could be substituted in alternative embodiments of the invention. For example, workpiece rotation assembly 30 could include a hydraulic motor and hydraulic pump(s) rather than an electric motor 32. Rotation of a rotatable shaft connected to workpiece holder 18 could also be actuated by belts, pulleys or the like. Mechanical rather than electronic means for stopping rotation of workpiece 18 after the desired degree of rotation could also be provided.

Apparatus 10 could be used in conjunction with an optical scanner for detecting defects in lumber boards or other workpieces traveling on a conveyor. By way of example, an apparatus for inspection and classification of attributes of a workpiece is described in U.S. Pat. No. 6,272,437 dated Aug. 7, 2001. Controller 40 of apparatus 10 could receive input from such a lumber scanner or optimizer to automate the process of deciding what boards to invert for subsequent optical scanning, operator inspection or downstream processing As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for turning a workpiece traveling on a conveyor comprising:
   (a) a workpiece holder for receiving an end portion of said workpiece;
   (b) a sensor for detecting the relative proximity of said workpiece and said workpiece holder; and
   (c) a rotation assembly for rotating said workpiece holder when said workpiece is within said holder,
wherein said apparatus turns said workpiece on said conveyor, while maintaining contact with said conveyor, from a first orientation wherein a face of said workpiece is oriented upwardly to a second orientation wherein said face of said workpiece is oriented downwardly.

2. The apparatus as defined in claim 1, wherein said workpiece holder comprises first and second spaced-apart surfaces defining a slot therebetween for receiving said workpiece, wherein said slot is open-ended to permit passage of said workpiece into and out of said slot.

3. The apparatus as defined in claim 2, comprising a housing for supporting said workpiece holder adjacent a side of said conveyor.

4. The apparatus as defined in claim 3, wherein said housing is height-adjustable for varying the vertical position of said workpiece holder relative to said conveyor.

5. The apparatus as defined in claim 2, wherein said rotation assembly moves said workpiece holder between a first position wherein one of said first and second surfaces is above said workpiece and the other of said first and second surfaces is below said workpiece, and a second position wherein said one of said first and second surfaces is below said workpiece and said other of said first and second surfaces is above said workpiece.

6. The apparatus as defined in claim 5, wherein rotation of said workpiece holder is stopped when said workpiece holder moves from said first position to said second position, thereby permitting said workpiece to exit said slot in said second position.

7. The apparatus as defined in claim 6, wherein said sensor senses when said workpiece holder has moved to said second position.

8. The apparatus as defined in claim 5, wherein said rotation assembly comprises a rotatable shaft coupled to an end of said workpiece holder remote from said conveyor.

9. The apparatus as defined in claim 8, wherein said rotation assembly comprises an actuator for periodically driving rotation of said shaft.

10. The apparatus as defined in claim 9, wherein said actuator comprises an electric motor.

11. The apparatus as defined in claim 9, wherein said actuator comprises a hydraulic motor.

12. The apparatus as defined in claim 9, wherein said sensor is operatively coupled to said actuator for actuating rotation of workpiece holder when said workpiece holder is in said first position.

13. The apparatus as defined in claim 12, further comprising a controller for controlling operation of said actuator, wherein said controller receives input from said sensor.

14. The apparatus as defined in claim 2, wherein said sensor senses when said workpiece has passed into said slot.

15. The apparatus as defined in claim 2, wherein said first and second surfaces extend in parallel planes and are spaced apart a sufficient distance to permit an end portion of a length of lumber to pass through said slot.

16. The apparatus as defined in claim 2, wherein said first and second surfaces are joined together at a location remote from said conveyor, wherein said workpiece holder is U-shaped in cross-section.

17. The apparatus as defined in claim 1, wherein said second orientation is inverted relative to said first orientation.

18. The apparatus as defined in claim 17, wherein said apparatus rotates said workpiece lengthwise 180 degrees when turning said apparatus from said first orientation to said second orientation.

19. The apparatus as defined in claim 1, further comprising a controller for controlling operation of said rotation assembly, wherein said controller receives input from said sensor.

20. An apparatus for turning a workpiece traveling on a conveyor comprising:
   (a) a housing positionable adjacent one side of said conveyor for supporting a rotatable member;
   (b) workpiece engagement means coupled to said rotatable member and positionable laterally of said conveyor for optionally engaging an end portion of said workpiece extending laterally of said conveyor;
   (c) a sensor for sensing the presence of said workpiece proximate said workpiece engagement means; and
   (d) an actuator operatively coupled to said sensor for causing rotation of said rotatable member and workpiece engagement means,
wherein said apparatus is adjustable to move said workpiece engagement means between a first configuration allowing said workpiece to pass through said workpiece engagement means and a second configuration causing said workpiece engagement means to turn said workpiece lengthwise 180 degrees on said conveyor from a first orientation wherein a face of said workpiece is oriented upwardly to a second orientation wherein said face of said workpiece is oriented downwardly.

21. The apparatus as defined in claim 20, wherein said workpiece engagement means comprises an open-ended slot sized to receive said workpiece.

22. The apparatus as defined in claim 21, wherein said workpiece is slot is positionable relative to said conveyor such that said workpiece is capable of passing through said slot.

23. A method of turning a workpiece traveling on a conveyor comprising:
   (a) positioning a workpiece turning apparatus adjacent said conveyor, said apparatus having a workpiece holder for receiving an end portion of said workpiece extending laterally of said conveyor;
   (b) sensing when said workpiece has passed into said holder; and
   (c) rotating said workpiece holder to thereby cause rotation of said workpiece on said conveyor, while maintaining contact with said conveyor, lengthwise 180 degrees to an inverted orientation.

24. The method as defined in claim 23, further comprising releasing said workpiece on to said conveyor in said inverted orientation for further travel thereon.

25. The method as defined in claim 23, further comprising controlling rotation of said workpiece holder between first and second positions, wherein said workpiece is capable of passing through said workpiece holder in at least said first position.

26. The method as defined in claim 23, wherein said workpiece holder engages said workpiece at a location laterally of said conveyor.

27. The apparatus as defined in claims 23, wherein said workpiece holder moves said workpiece between said first and second orientations without applying clamping forces to said workpiece.

28. The apparatus as defined in claim 27, wherein said workpiece holder comprises first and second surfaces defining a slot therebetween for receiving said workpiece, wherein said slot is open-ended to permit passage of said workpiece into and out of said slot and wherein said surfaces are maintained a fixed distance apart.

29. The apparatus as defined in claim 28, wherein said surfaces are parallel plates maintained between about 3 inches and 12 inches apart.

30. The apparatus as defined in claim 27, wherein said first and second surfaces are located laterally of said conveyor for receiving therebetween an end portion of said workpiece extending laterally of said conveyor.

31. The method as defined in claim 30, wherein said workpiece holder causes rotation of said workpiece without the application of clamping forces thereto.

* * * * *